(12) United States Patent
Marsala (10) Patent No.: US 10,968,737 B2
(45) Date of Patent: Apr. 6, 2021

(54) ACOUSTIC COUPLER FOR DOWNHOLE LOGGING WHILE DRILLING APPLICATIONS

(71) Applicant: Saudi Arabian Oil Company, Dhahran (SA)

(72) Inventor: Alberto F. Marsala, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 155 days.

(21) Appl. No.: 15/991,645

(22) Filed: May 29, 2018

(65) Prior Publication Data

US 2018/0347349 A1    Dec. 6, 2018

Related U.S. Application Data

(60) Provisional application No. 62/512,902, filed on May 31, 2017.

(51) Int. Cl.
| | |
|---|---|
| *E21B 47/14* | (2006.01) |
| *G01V 1/44* | (2006.01) |
| *E21B 7/04* | (2006.01) |
| *E21B 49/00* | (2006.01) |
| *E21B 47/16* | (2006.01) |

(Continued)

(52) U.S. Cl.
CPC ............... *E21B 47/16* (2013.01); *E21B 7/04* (2013.01); *E21B 47/024* (2013.01); *E21B 47/0224* (2020.05); *E21B 49/003* (2013.01); *E21B 49/005* (2013.01); *G01V 1/46* (2013.01); *G01V 1/52* (2013.01); *G01V 1/50* (2013.01);

(Continued)

(58) Field of Classification Search
CPC .......... E21B 47/14; E21B 49/003; E21B 7/04; G01V 1/44
See application file for complete search history.

(56) References Cited

U.S. PATENT DOCUMENTS

| | | |
|---|---|---|
| 3,292,143 A | 12/1966 | Russell |
| 5,128,901 A | 7/1992 | Drumheller |

(Continued)

OTHER PUBLICATIONS

Brie et al., "SPE 30595: Shear Sonic Interpretation in Gas-Bearing Sands," SPE, SPE Annual Technical Conference and Exhibition, Oct. 22-25, 1995, 10 pages.

(Continued)

*Primary Examiner* — Catherine Loikith
(74) *Attorney, Agent, or Firm* — Fish & Richardson P.C.

(57) ABSTRACT

A deviated or horizontal wellbore is drilled in a geologic formation with a multiphase fluid including a gas by a rotating drill bit positioned at a downhole end of a drill string. Portions of the gas are released into the wellbore during the drilling. During the drilling, soundwaves are emitted into the geologic formation from within the wellbore by a set of acoustic emitters attached to the drill string. The received reflected soundwaves are transmitted by the set of solid acoustic couplers to a set of acoustic sensors contacting the solid acoustic couplers. The reflected soundwaves are received by the acoustic sensors. Rock properties of the geologic formation are determined based on the less attenuated reflected soundwaves transmitted to the acoustic sensors by the solid acoustic couplers. A drilling direction of the wellbore is adjusted based on the determined rock properties.

13 Claims, 5 Drawing Sheets

(51) Int. Cl.
  *G01V 1/52*    (2006.01)
  *G01V 1/46*    (2006.01)
  *E21B 47/0224*   (2012.01)
  *E21B 47/024*   (2006.01)
  *G01V 1/50*    (2006.01)

(52) U.S. Cl.
  CPC .... *G01V 2001/526* (2013.01); *G01V 2200/16* (2013.01); *G01V 2210/121* (2013.01)

(56) References Cited

U.S. PATENT DOCUMENTS

| | | | |
|---|---|---|---|
| 5,753,812 A * | 5/1998 | Aron | E21B 47/011 |
| | | | 73/152.47 |
| 5,886,303 A | 3/1999 | Rodney | |
| 7,595,737 B2 | 9/2009 | Fink et al. | |
| 7,913,806 B2 * | 3/2011 | Pabon | G01V 1/523 |
| | | | 166/254.2 |
| 8,069,913 B2 | 12/2011 | Coste | |
| 9,494,033 B2 | 11/2016 | Taherian et al. | |
| 9,557,434 B2 | 1/2017 | Keller et al. | |
| 2004/0246141 A1 | 12/2004 | Tubel et al. | |
| 2005/0078555 A1 | 4/2005 | Tang et al. | |
| 2015/0204993 A1 * | 7/2015 | Leggett, III | E21B 47/107 |
| | | | 367/7 |

OTHER PUBLICATIONS

International Search Report and Written Opinion issued in International Application No. PCT/US2018/035110 dated Aug. 24, 2018, 16 pages.

\* cited by examiner

ACOUSTIC COUPLER FOR DOWNHOLE LOGGING WHILE DRILLING APPLICATIONS

CROSS-REFERENCE TO RELATED APPLICATION(S)

This application claims the benefit of priority to U.S. Provisional Application Ser. No. 62/512,902, filed May 31, 2017, the contents of which are hereby incorporated by reference.

TECHNICAL FIELD

This specification relates to the field of wellbore logging.

BACKGROUND

In hydrocarbon production, a wellbore is drilled into a hydrocarbon bearing geological formation. Sometimes during the drilling process, well logs are taken. Certain types of logging-while-drilling technologies include gamma logs, nuclear-magnetic resonance logs, and acoustic logs. To take a well log, a logging tool is incorporated into a drill string assembly. Alternatively, logs can be taken using a wireline or coiled conveyance tubing after the wellbore has been completed.

SUMMARY

This specification describes technologies relating to an acoustic coupler for downhole logging applications.

An example implementation of the subject matter described within this disclosure is a method with the following features. A deviated or horizontal wellbore is drilled in a geologic formation with a multiphase fluid including a gas by a rotating drill bit positioned at a downhole end of a drill string. Portions of the gas are released into the wellbore during the drilling. During the drilling, soundwaves are emitted into the geologic formation from within the wellbore by a set of acoustic emitters attached to the drill string. Reflected soundwaves are received, by a set of solid acoustic couplers attached to the drill string, from the geologic formation. The reflected soundwaves are carried from the geologic formation to the set of solid acoustic couplers at least in part through the portions of the gas released into the wellbore during the drilling. The received reflected soundwaves are transmitted by the set of solid acoustic couplers to a set of acoustic sensors contacting the solid acoustic couplers. The reflected soundwaves transmitted by the solid acoustic couplers are less attenuated compared to the reflected soundwaves transmitted through the portions of the gas released into the wellbore during the drilling. The reflected soundwaves transmitted by the solid acoustic couplers are received by the acoustic sensors. Rock properties of the geologic formation are determined based on the less attenuated reflected soundwaves transmitted to the acoustic sensors by the solid acoustic couplers. A drilling direction of the wellbore is adjusted based on the determined rock properties.

Aspects of the example method, which can be combined with the example method alone or in combination, include the following. Drilling the wellbore includes drilling the wellbore in an underbalanced condition.

Aspects of the example method, which can be combined with the example method alone or in combination, include the following. The wellbore is less than 3 and ¾ inches in diameter.

Aspects of the example method, which can be combined with the example method alone or in combination, include the following. The drill string includes coiled tubing.

Aspects of the example method, which can be combined with the example method alone or in combination, include the following. The set of solid acoustic couplers is a first set of solid acoustic couplers. The method further includes transmitting, by a second set of solid acoustic couplers contacting the set of acoustic transmitters and to the geologic formation, the soundwaves emitted by the set of acoustic transmitters.

Aspects of the example method, which can be combined with the example method alone or in combination, include the following. The first set of solid acoustic couplers have a different stiffness compared to the second set of solid acoustic couplers.

Aspects of the example method, which can be combined with the example method alone or in combination, include the following. The first set of solid acoustic couplers have less stiffness compared to the second set of solid acoustic couplers.

Aspects of the example method, which can be combined with the example method alone or in combination, include the following. The drill string is centralized in the wellbore by the solid acoustic couplers.

Aspects of the example method, which can be combined with the example method alone or in combination, include the following. The solid acoustic couplers contact an inner wall of the wellbore to transmit the received reflected soundwaves to the acoustic sensors.

Aspects of the example method, which can be combined with the example method alone or in combination, include the following. The drilling direction of the wellbore is adjusted in real-time based on the determined rock properties of the geologic formation.

An example implementation of the subject matter described within this disclosure is a bottom hole assembly with the following features. A drill string is configured to be placed in a wellbore. The drill string includes coiled tubing. A drill bit is positioned at a downhole end of the drill string. The drill bit is configured to form the wellbore within a geologic formation. A drill motor is positioned uphole of the drill bit. The drill motor is configured to rotate the drill bit independent of the drill string. An acoustic sub-assembly is attached to the drill string uphole of the drill motor. The acoustic sub assembly includes a set of acoustic emitters. The set of acoustic emitters is configured to emit emitted soundwaves into the geologic formation from within the wellbore. A set of acoustic couplers is configured to receive reflected soundwaves from the geologic formation within the wellbore. The reflected soundwaves are reflections of the emitted soundwaves. A set of acoustic sensors is configured to be placed in the wellbore and attached to the of acoustic couplers. The set of acoustic couplers is configured to transmit the received reflected soundwaves from the geologic formation to the acoustic sensors with less signal attenuation compared to a direct transmission of the reflected soundwaves from the geologic formation to the acoustic sensors.

Aspects of the example implementation, which can be combined with the example implementation alone or in combination, include the following. The set of acoustic coupler are sized to contact the acoustic sensor and to extend into an annulus formed by an inner wall of the wellbore and an outer surface of the acoustic sub-assembly.

Aspects of the example implementation, which can be combined with the example implementation alone or in combination, include the following. The set of acoustic couplers are sized to contact an inner wall of the wellbore.

Aspects of the example implementation, which can be combined with the example implementation alone or in combination, include the following. Each of the acoustic couplers are radially separated from each other at 90 degree intervals.

The details of one or more implementations of the subject matter described in this specification are set forth in the accompanying drawings and the description that follows. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In hydrocarbon drilling and production, acoustic logs are often taken. Acoustic logs can provide important information about a wellbore, including porosity of wellbore sections, gas saturation, bed boundaries in a geologic formation, fractures in the wellbore or completion cement, and many other pieces of information. If such information is taken during drilling operation (logging while drilling or LWD), then the information can be used to make adjustments to drilling operations in real-time. Such adjustments can include rate of penetration, drilling direction, altering mud weight, and many others.

Acoustic logging involves emitting a soundwave, either sonic or ultrasonic, from an acoustic emitter that is included with an acoustic logging tool. A reflected soundwave returns from the formation and is received by an acoustic sensor that is mounted on the same acoustic logging tool. The reflected soundwave can be analyzed to determine properties of the wellbore, the geologic formation, or both.

In instances where an annulus of the wellbore is filled with a multi-phase or gaseous well fluid (such as when the wellbore is in an unbalanced condition), the soundwaves have difficulty propagating from the acoustic logging tool and into the formation, and vice versa. Soundwaves do not propagate as easily through gas as they do through a solid or a liquid. Drilling a wellbore into a gas-bearing geological formation in an underbalanced condition can experience issues with such a phenomenon. Drilling a wellbore in an underbalanced condition means that the wellbore is producing during drilling operations. That is, fluid is flowing from the reservoir into the wellbore. In other words, the weight of the drilling fluid is such that the pressure within the wellbore is lower than that of the wellbore. Operations are often performed in an underbalanced condition to prevent damage to the formation that can be caused by the drilling fluid flowing into the formation. In some instances, low pressure gas reservoirs are drilled in an underbalanced condition. In some instances, flowback systems are located at the topside facility to process the reservoir fluids and recycle drilling fluids. In some instances, the flowback systems limit the flowrate out of the wellbore, and therefore provide a lower limit on the pressure in the wellbore. The high gas fraction in such a situation can attenuate the acoustic signals. Such attenuation can result in missing or noisy data. Missing or noisy data can have a significant impact on systems that rely on a continuous feed of data, such as a directional drilling system.

This specification describes an acoustic sensor and an acoustic emitter on an acoustic LWD tool. The performance of either the acoustic sensor or the acoustic emitter is or both are augmented with a piece of acoustic material, for example, acoustic synthetic material, to better acoustically couple the sensors with the rock formation. The added material improves acoustic coupling with the rock formation by effectively reducing the distance between the acoustic emitter, acoustic sensor, or both, and the rock formation. The decreased distance at least partially mitigates the negative effects of multiphase or gaseous fluids in the annulus. Such a tool can be used in small diameter wellbores, for example, 3 and ¾ inches in diameter or smaller wellbores. The smaller diameter wellbore improves the effectiveness of the acoustic coupler as the necessary distance spanned by the acoustic coupler is reduced.

The acoustic coupler can be added to acoustic logging tools in a coiled tubing configuration as well. In such an implementation, there is a continuous coil of tubing that conveys the drilling system and pushes the drilling bottom hole assembly with a motor turbine, the logging tools, or both. One of the main difference with conventional rotary drilling is that in coiled tubing drilling the coil does not rotate (unlike the drilling string), so the logging tools will not rotate, rather, the logging tools slide inside the wellbore without any significant rotation. The lack of rotations facilitates the coupling of the acoustic tool with the rock formation using the configuration object of this invention. The tool described within this specification allows for the possibility to have acoustic logging while drilling with coiled tubing in underbalanced conditions with high gas presence. In coiled tubing implementations, the logging-while-drilling tool does not rotate, and the annulus dimension is small (for example, on the order of a few millimeters). Also, in coiled tubing drilling, the acoustic couplers can be implemented to address the issue of geo-steering. In such an example, the acoustic couplers can decrease the attenuation on the acoustic LWD tool because they are solid. In general, acoustic waves travel more easily and with less attenuation through solid mediums as compared to gaseous mediums. The decrease in attenuation allows for a greater signal to noise ratio since the solid couplers cause less sound attenuation, allowing a coiled tubing drilling system to more quickly and accurately determine rock properties in proximity to the drill bit, and thus allow for more accurate information that can be used for geo-steering and targeting. The higher signal to noise ratio reduce any guess-work that may need to be done by a drilling operator or controller. The removal of such guess-work allows geo-steering adjustments to be made to get from point A to point B within the geologic formation more easily. In some instances, a drill bit travels within a particular hydrocarbon bearing sweet spot geological layer, characterized by a certain porosity and gas saturation, and having a certain range of acoustic velocities. If the properties are changing, it can mean that the drill bit is travelling out of a target reservoir layer. In such an instance, the trajectory of the drill bit may need readjusting.

Figure 1:
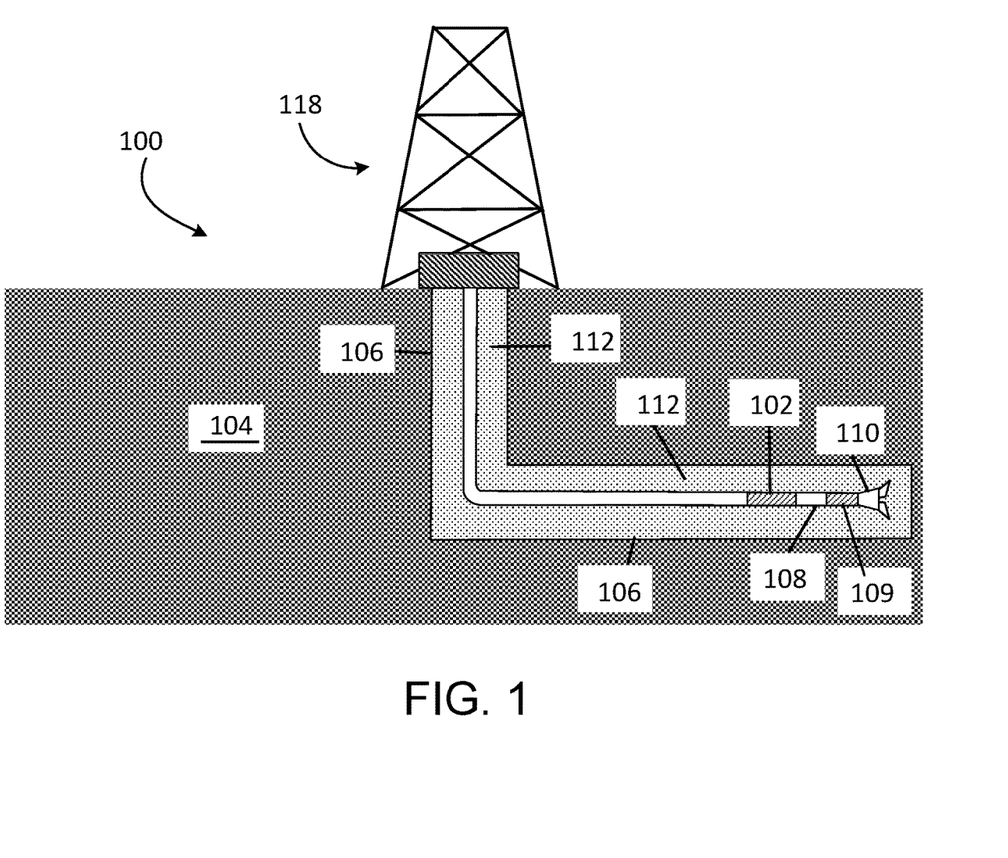
FIG. 1 shows a schematic of an example wellsite with a logging-while-drilling tool positioned within a wellbore.

FIG. 1 shows a schematic of an example of a well drilling system 100. The well drilling system 100 includes a drilling derrick 118 that supports a drill string 108. The drill string 108 extends into a wellbore 106 filled with a multiphase fluid 112. A drill bit 110 is positioned at a downhole end of the drill string 108. The drill bit 110 forms the wellbore 106 by pulverizing parts of the geologic formation 104 into small pieces called cuttings. The cuttings can be carried out of the wellbore 106 with drilling fluid. The well drilling system 100 also includes a LWD sub-assembly 102 that is attached to the drill string 108 within the wellbore 106. Additionally, the drilling system 100 can include a drilling motor 109 that is connected to the drill string just uphole of the drill bit. The drilling motor 109 can include a downhole electric motor, a hydraulic mud motor, a pneumatic motor, or any other downhole motor. In some implementations, the drill string can include coiled tubing. In some implementations, the majority of the drill string does not rotate during drilling operations. In such instances, the drilling motor 109 rotates the drill bit 110 to allow the drilling to continue.

An oscillating motion generated by the acoustic emitter or acoustic sensor inside the LWD sub-assembly 102 within the geologic formation 104 produces a soundwave, also called an acoustic wave. Wave theory predicts how an acoustic signal propagates through the wellbore 106 and the geologic formation 104. The elastic nature of the geologic formation 104, that is, the property of matter that causes the geologic formation 104 to resist deformation in volume or shape, permits wave propagation. The acoustic waves are transmitted through the geologic formation 104 some distance from the LWD sub-assembly 102. Particles within the geologic formation 104 do not travel with the wave, but only vibrate around their mean central position. Acoustic waves are classified according to the direction of particle displacement with respect to the direction of wave propagation. Compressional waves indicate a particle displacement that is parallel to the direction of the wave propagation, while shear waves indicate a particle displacement that is perpendicular to the direction of propagation. The velocities of these acoustic waves can provide information on the properties of the geologic formation 104 and the wellbore 106, such as lithology (mineralogy), cementation, clay content, texture, porosity, pore-fluid composition and saturation, overburden- and pore-fluid pressure (stress), temperature, and many other properties.

Acoustic waves travel through gas with greater difficulty than through a solid or liquid. That is, the acoustic waves experience greater attenuation when traveling through a gas. In some instances, such as when the wellbore 106 is underbalanced (that is, there is insufficient mud-weight to prevent the wellbore 106 from producing fluid), a high gas content can be present in the wellbore 106. Such instances can skew acoustic LWD data due to the increased attenuation of the acoustic signals. In instances where the acoustic LWD data is used for geo-steering, such attenuation can lead to improper direction changes due to inaccurate data. For example, geo-steering drilling with coiled tubing in an underbalanced condition can lead to a high enough gas fraction in the wellbore annulus to attenuate the acoustic signals.

Figure 2A:
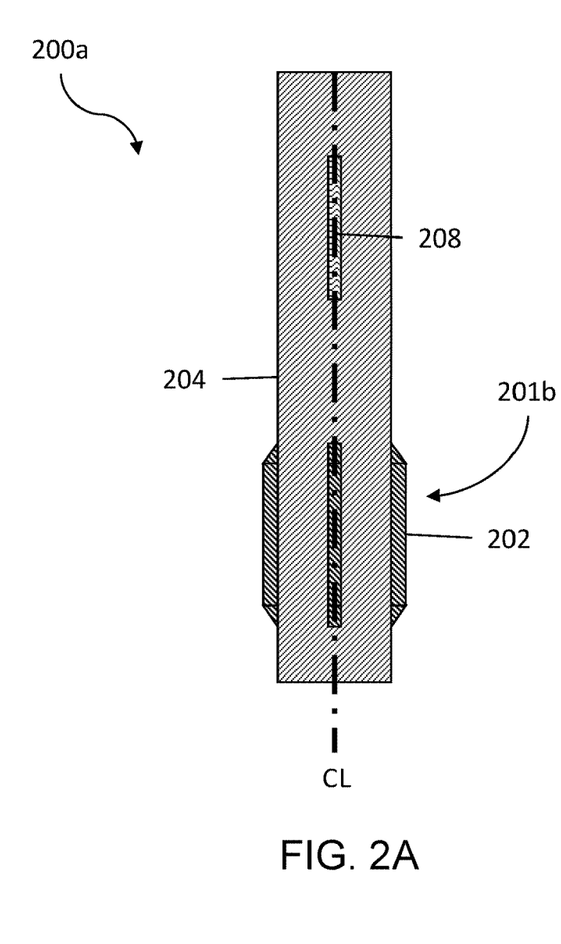
FIGS. 2A-2D show multiple views of schematics of a first acoustic logging-while-drilling tool with acoustic couplers.
Figure 2B:
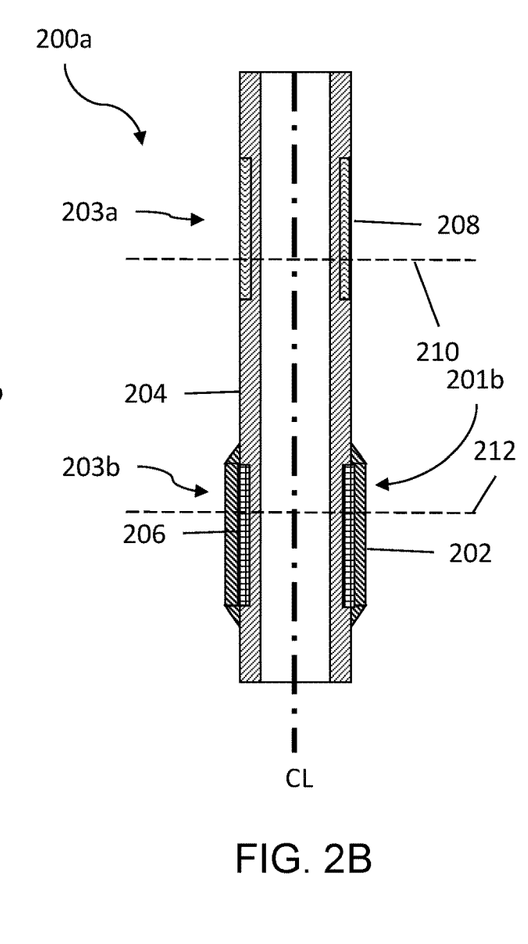
Figure 2C:
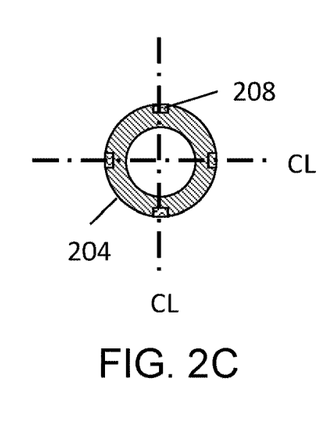
Figure 2D:
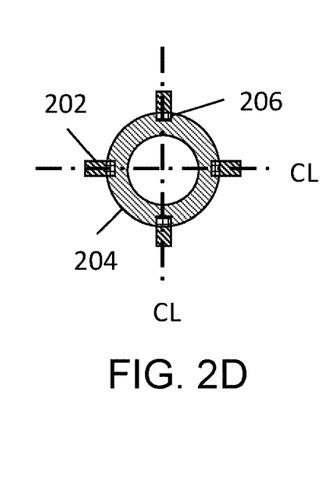

To remedy the excess attenuation caused by gaseous fluid in the wellbore 106, the first augmented acoustic sub assembly 200a shown in FIGS. 2A-2D can be used as the LWD tool 102. FIG. 2A shows a side view of a schematic of the acoustic sub assembly 200a while FIG. 2B shows a side cross sectional view of the schematic of the wellbore acoustic sub assembly 200a. Where shown in the figures, CL identifies the respective center line of the features shown in the corresponding figure. FIG. 2C shows a top cross sectional view of the schematic of the acoustic sub assembly 200a across a first line 210, while FIG. 2D shows a bottom cross sectional view of the schematic of the wellbore acoustic sub assembly 200a across the second line 212.

The wellbore acoustic sub assembly 200a attaches to the drill string 108 like the LWD tool 102. The wellbore acoustic sub assembly 200a includes a tubing sub-assembly or elongate cylindrical member 204 with a substantially cylindrical cross-section that can be positioned in the wellbore 106. The wellbore acoustic sub assembly 200a also includes multiple acoustic emitters 208 that are attached to an elongate tubular member 204. The multiple acoustic emitters 208 collectively form an acoustic emitter subassembly 203a. Each of the multiple acoustic emitters 208 can emit soundwaves (acoustic waves) into the geologic formation 104 from within the wellbore 106. In some implementations, each of the acoustic emitters 208 can include an array of multiple emitters. The wellbore acoustic sub assembly 200a also includes multiple acoustic sensors 206 that are attached to the elongate tubular member 204. The acoustic sensors 206 can receive reflected soundwaves that are reflections of the emitted soundwaves from the geologic formation 104 within the wellbore 106. Each of the acoustic sensors 206 can include an array of multiple sensors. The acoustic emitters 208 and acoustic sensors 206 can be either monopole or dipole. The wellbore acoustic sub assembly 200a can also include separate centralizers (not shown) that are separate from the acoustic couplers 202 designed to keep the acoustic sub assembly 200a centered within the wellbore 106.

The acoustic sub assembly 200a also includes multiple acoustic couplers 202. The acoustic couplers 202 are mounted on an outer surface of the elongate tubular member 204. A set of acoustic couplers 201b can be used. Each set of acoustic couplers 202 can include a number of couplers 202 equal to either a number of acoustic sensors 206 included in the acoustic sub assembly 200a. For example, if the acoustic sub assembly 200a includes four acoustic sensors 206, then a set of four acoustic couplers 202 can be used, that is, one coupler 202 for each sensor 206. The set of acoustic couplers 201b is attached to the elongate tubular member 204 and the acoustic sensors 206. More specifically, the set of acoustic couplers 201b is placed between the acoustic sensors 206 and the wall of the wellbore 106 to create an acoustic sensor sub assembly 203b. The acoustic couplers 202 can be screwed to, glued to, embedded, or otherwise attached to the elongate cylindrical member 204 with any form of fastener or adhesive. The acoustic couplers 202 can be replaced without any damage to the acoustic sensors 206. In other words, the acoustic sensors 206 can function as intended after the acoustic couplers 202 have been removed.

Figure 3A:
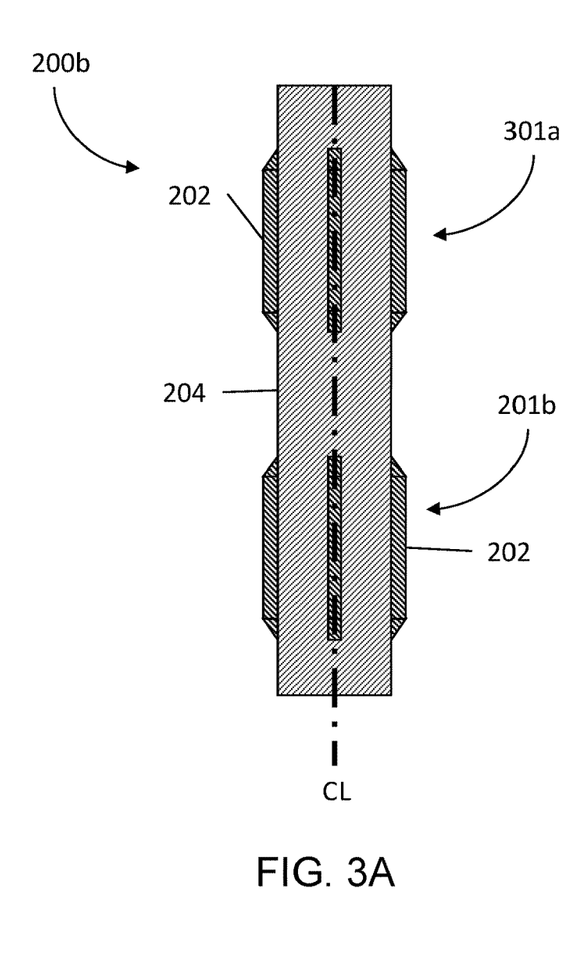
FIGS. 3A-3D show multiple views of schematics of a second acoustic logging-while-drilling tool with acoustic couplers.
Figure 3B:
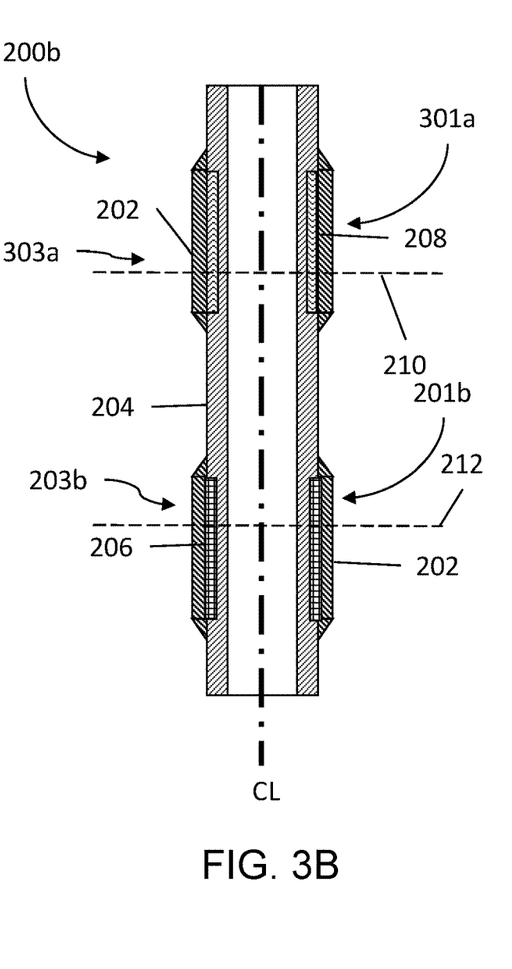
Figure 3C:
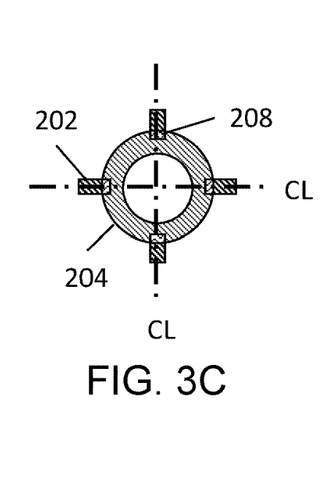
Figure 3D:
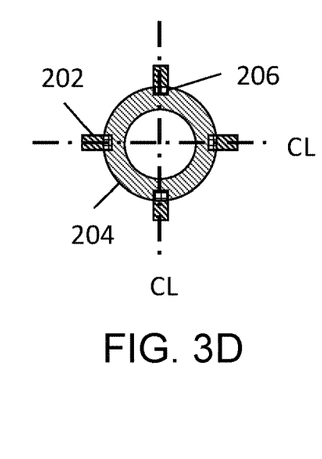

Some implementations of an augmented acoustic sub assembly 200b shown in FIGS. 3A-3D can be used like the LWD tool 102. FIG. 3A shows a side view of a schematic of the acoustic sub assembly 200b while FIG. 3B shows a side cross sectional view of the schematic of the wellbore acoustic sub assembly 200b. FIG. 3C shows a top cross sectional view of the schematic of the acoustic sub assembly 200b across a first line 210, while FIG. 3D shows a bottom cross sectional view of the schematic of the wellbore acoustic sub assembly 200b across the second line 212.

The wellbore acoustic sub assembly 200b attaches to the drill string 108 like the LWD tool 102. The wellbore acoustic sub assembly 200b includes a tubing sub-assembly or elongate cylindrical member 204 with a substantially cylindrical cross-section that can be positioned in the wellbore 106. The wellbore acoustic sub assembly 200b also includes multiple acoustic emitters 208 that are attached to an elongate tubular member 204. The multiple acoustic emitters 208 collectively form an acoustic emitter subassembly 303a. Each of the multiple acoustic emitters 208 can emit soundwaves (acoustic waves) into the geologic formation 104 from within the wellbore 106. Each of the acoustic emitters can include an array of multiple emitters. The wellbore acoustic sub assembly 200b also includes multiple acoustic sensors 206 that are attached to the elongate tubular member 204. The acoustic sensors 206 can receive reflected soundwaves that are reflections of the emitted soundwaves from the geologic formation 104 within the wellbore 106. Each of the acoustic sensors 206 can include an array of multiple sensors. The acoustic emitters 208 and acoustic sensors 206 can be either monopole or dipole. The wellbore acoustic sub assembly 200b can also include separate centralizers that are separate from the acoustic couplers 202 designed to keep the acoustic sub assembly 200b centered within the wellbore 106.

The acoustic sub assembly 200b also includes multiple acoustic couplers 202. The acoustic couplers 202 are mounted on an outer surface of the elongate tubular member 204. Two sets of acoustic couplers 202 (for example, a first set 301a and a second set 201b) can be used. Each set of acoustic couplers 202 includes a number of couplers 202 equal to either a number of acoustic emitters 208 or a number of acoustic sensors 206 included in the acoustic sub assembly 200b. For example, if the acoustic sub assembly 200b includes four acoustic sensors 206, then a set of four acoustic couplers 202 can be used, that is, one coupler 202 for each sensor 206. The first set of acoustic couplers 201a is attached to the elongate tubular member 204 and the acoustic emitters 208. More specifically, the first set of acoustic couplers 201a is placed between the acoustic emitters 208 and the wall of the wellbore 106 to create an acoustic emitter sub assembly 303a. The second set of acoustic couplers 201b is attached to the elongate tubular member 204 and the acoustic sensors 206. More specifically, the second set of acoustic couplers 201b is placed between the acoustic sensors 206 and the wall of the wellbore 106 to create an acoustic sensor sub assembly 203b. The acoustic couplers 202 can be screwed to, glued to, embedded, or otherwise attached to the elongate cylindrical member 204 with any form of fastener or adhesive. The acoustic couplers 202 can be replaced without any damage to either the acoustic emitters 208 or the acoustic sensors 206. In other words, the acoustic emitters 208 or the acoustic sensors 206 can function as intended after the acoustic couplers 202 have been removed.

Figure 4A:
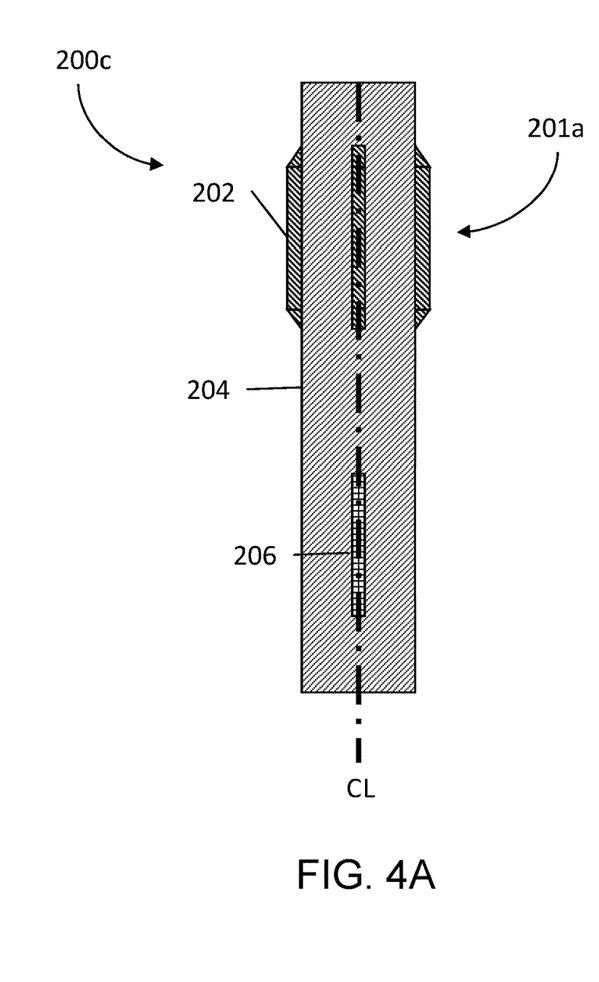
FIGS. 4A-4D show multiple views of schematics of a third acoustic logging-while-drilling tool with acoustic couplers.
Figure 4B:
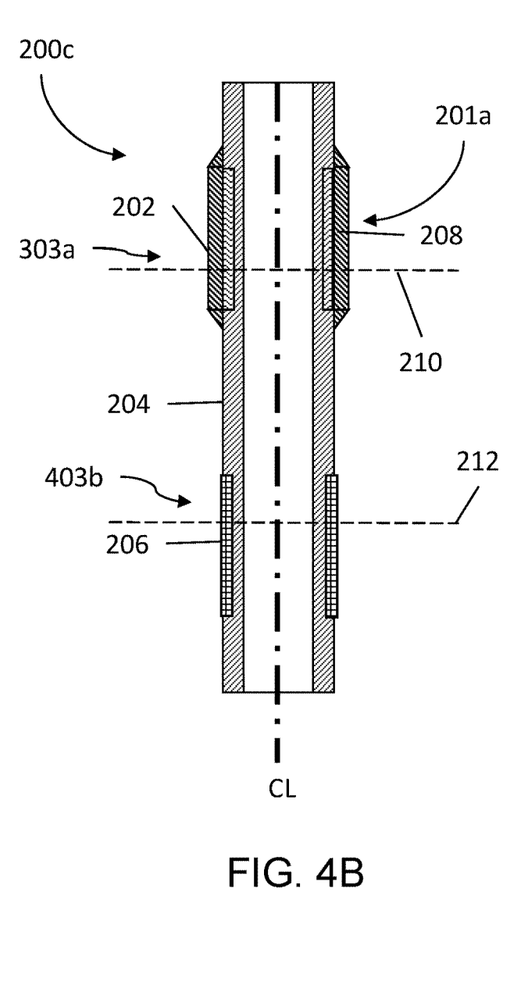
Figure 4C:
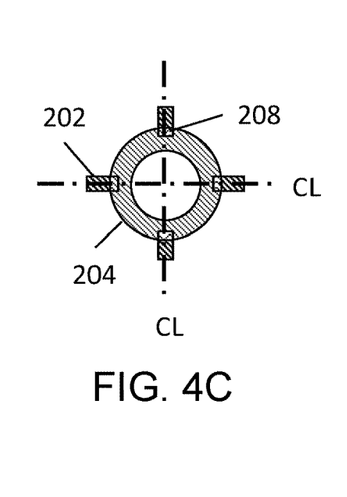
Figure 4D:
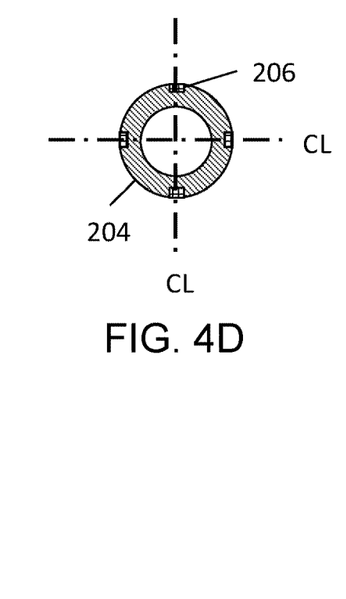

Some implementations of an augmented acoustic sub assembly 200c shown in FIGS. 4A-4D can be used like the LWD tool 102. FIG. 4A shows a side view of a schematic of the acoustic sub assembly 200c while FIG. 4B shows a side cross sectional view of the schematic of the wellbore acoustic sub assembly 200c. FIG. 4C shows a top cross sectional view of the schematic of the acoustic sub assembly 200c across a first line 210, while FIG. 4D shows a bottom cross sectional view of the schematic of the wellbore acoustic sub assembly 200c across the second line 212.

The wellbore acoustic sub assembly 200c attaches to the drill string 108 in place of the LWD tool 102. The wellbore acoustic sub assembly 200c includes a tubing sub-assembly or elongate cylindrical member 204 with a substantially cylindrical cross-section that can be positioned in the wellbore 106. The wellbore acoustic sub assembly 200c also includes multiple acoustic emitters 208 that are attached to an elongate tubular member 204. Each of the multiple acoustic emitters 208 can emit soundwaves (acoustic waves) into the geologic formation 104 from within the wellbore 106. Each of the acoustic emitters can include an array of multiple emitters. The wellbore acoustic sub assembly 200c also includes multiple acoustic sensors 206 that are attached to the elongate tubular member 204. The acoustic sensors 206 can receive reflected soundwaves that are reflections of the emitted soundwaves from the geologic formation 104 within the wellbore 106. Each of the acoustic sensors 206 can include an array of multiple sensors. The acoustic emitters 208 and acoustic sensors 206 can be either monopole or dipole. The wellbore acoustic sub assembly 200c can also include separate centralizers that are separate from the acoustic couplers 202 designed to keep the acoustic sub assembly 200c centered within the wellbore 106.

The acoustic sub assembly 200c also includes multiple acoustic couplers 202. The acoustic couplers 202 are mounted on an outer surface of the elongate tubular member 204. A set of acoustic couplers 201a can be used. Each set of acoustic couplers 202 can include a number of couplers 202 equal to either a number a number of acoustic sensors 206 included in the acoustic sub assembly 200c. For example, if the acoustic sub assembly 200c includes four acoustic emitters 208, then a set of four acoustic couplers 202 can be used, that is, one coupler 202 for each emitter 208. The set of acoustic couplers 201a is attached to the elongate tubular member 204 and the acoustic emitters 208. More specifically, the set of acoustic couplers 201a is placed between the acoustic emitters 208 and the wall of the wellbore 106 to create an acoustic emitter sub assembly 303a. Each of the acoustic sensors 206 can include an array of multiple sensors. In the illustrated implementation, an acoustic sensor assembly 403b lacks any acoustic couplers 202. The acoustic couplers 202 can be screwed to, glued to, embedded, or otherwise attached to the elongate cylindrical member 204 with any form of fastener or adhesive. The acoustic couplers 202 can be replaced without any damage to either the acoustic emitters 208. In other words, the acoustic emitters 208 can function as intended after the acoustic couplers 202 have been removed.

In any of the implementations described earlier, each of the acoustic couplers 202 is equidistantly and circumferentially separated from one another and is positioned to be attached to each coupler's respective acoustic emitter 208 or acoustic sensor 206 which are also equidistantly and circumferentially separated from one another. For example, if the acoustic sub assembly 200a includes four acoustic emitters 208 and four acoustic sensors 206, then each of the four acoustic emitters 208 and each of the four acoustic sensors 206 are positioned 90° from one another. Since each acoustic coupler 202 is attached to its respective acoustic emitter 208 or acoustic sensor 206, then each acoustic coupler 202 would also be positioned 90° from one another. Alternatively, the circumferential distances between the acoustic couplers can vary, for example, if the circumferential distances between the acoustic emitters or the acoustic sensors vary.

The acoustic couplers 202 reduce the attenuation of both the acoustic waves transmitted by the acoustic sub assembly 200b and those received by acoustic sub assembly 200b by reducing the effective distance between the wall of the wellbore 106 and the surface of the elongate tubular member 204. In the context of this disclosure, "attach" and "contact" are used interchangeable. In the context of this disclosure, both terms encompass a direct connection, such as between the emitter/coupler or sensor/coupler. That is, the acoustic couplers 202 can be sized to contact (for example, directly, physically contact) the acoustic sensors 206 (or acoustic emitters 208) and extend outward into an annulus formed by an inner wall of the wellbore 106 and an outer surface of the tubing sub-assembly 204. In other words, the acoustic couplers 202 extend radially from the surface of the elongate cylindrical member 204 towards a wall of a wellbore 106. In some implementations, the acoustic couplers 202 can extend at least 80% of a distance between an outer surface of the elongate cylindrical member 204 and a wall of the wellbore 106. In some implementations, the acoustic couplers 202 can extend less than 80% of the distance. By doing so, the acoustic couplers 202 serve as a solid medium through which the soundwaves can propagate. In some implementations, the acoustic couplers 202 can be sized to contact the inner wall of the wellbore 106. In such implementations, the soundwaves can propagate almost entirely in a solid medium, thereby suffering little to no attenuation regardless of the phase of the fluids in the annulus.

In some implementations, the acoustic couplers 202 can also be designed and manufactured to act as centralizers that keep the drill string 108, an acoustic sub assembly, such as acoustic sub assembly 200b, or both, centered within the wellbore 106. The acoustic couplers 202 help reduce the attenuation of both compressional waves and shear waves. The cross-sectional shape of the acoustic couplers 202 is configured to minimize acoustic attenuation at both sonic and ultrasonic frequencies. A wide range of acoustic frequencies can be used. For example, to gain different depths of investigation in the geologic formation 104, higher frequencies (on the order of hundreds of kilohertz) can be used for shallower depths while and lower frequencies (on the order of hundreds to a few kilohertz) can be used to scan deeper into the geologic formation 104. The shape of the coupler is also chosen in a way to minimize hydraulic obstructions in the annulus to the flow of mud and cuttings. In some implementations, the couplers can work also as mechanical stabilizers for the logging tool while within the wellbore. The stabilization allowing the logging tool to be centralized inside the wellbore and coupled with the rock formation not only on the bottom where the coil slides Such stabilization also maintains centralization of the tool within horizontal or deviated wellbores. In some implementations, the shape, placement and orientation of the couplers is designed in a way to avoid a total obstruction of the annulus allowing the flowing of the mud and the cuttings.

The acoustic couplers 202 can be made of any material (for example, elastomer or other material) that is chemically inert to a well fluid and a drilling fluid, and resistant to abrasion, while also being acoustically conductive. Such a material can be either a monomer or polymer. Suitable materials may include Teflon™, Viton™, Plexiglas™, or any other resilient elastomer. An elastomer is used to prevent resonance with the metallic elongate metal tubing 204. In some implementations, the set of acoustic couplers coupled to the acoustic emitters can be made of a first, stiffer elastomer, while the set of acoustic couplers coupled to the acoustic sensors can be made of a second, softer elastomer or vice versa. In other words, the set of acoustic couplers for the acoustic emitters can be made of a different elastomer than the set of acoustic couplers for the acoustic sensors. In some implementations, the set of acoustic couplers coupled to the acoustic emitters can be made of the same material as the set of acoustic couplers coupled to the acoustic sensors. The materials can be selected to minimize acoustic attenuation across a variety of frequency bands. Different materials affect the signal to noise ratio as the material can affect the attenuation of the acoustic waves. The material also needs to be of sufficient strength and resilience to handle the mechanical, to pressure and temperature, and to the abrasive stresses experiences during drilling. The selected material can allow shear waves and compressional waves to propagate through the acoustic coupler.

Any of the implementations described within this specification can be used to determine the mechanical properties of the geologic formation 104, such as elastic dynamics and density. Acoustic wave velocity can be related to rock elastic properties through three constants of proportionality, elastic moduli, and Poisson's ratio. These serve as the bases for mechanical property evaluation by acoustic logs. In practice, the geologic formation 104 contains varying pore sizes, pore fill (for example, clays), fractures, as well as others. Consequently, the geological formation 104 is neither truly isotropic nor homogeneous. Furthermore, in fluid-saturated rocks, the acoustic properties can also depend on the type and the volume of fluids present both within the geologic formation 104 and within the wellbore 106. Such data can aid in geo-steering of an active drill string during drilling operations. In some implementations, the acoustic sub assembly, such as sub assembly 200b, may be rotationally stable while the drill string rotates. That is, the acoustic sub assembly can be radially stationary during drilling operations. While acoustic logging has been described within this specification in the context of LWD, similar principles apply to logging with coiled tubing after drilling has been completed.

Figure 5:
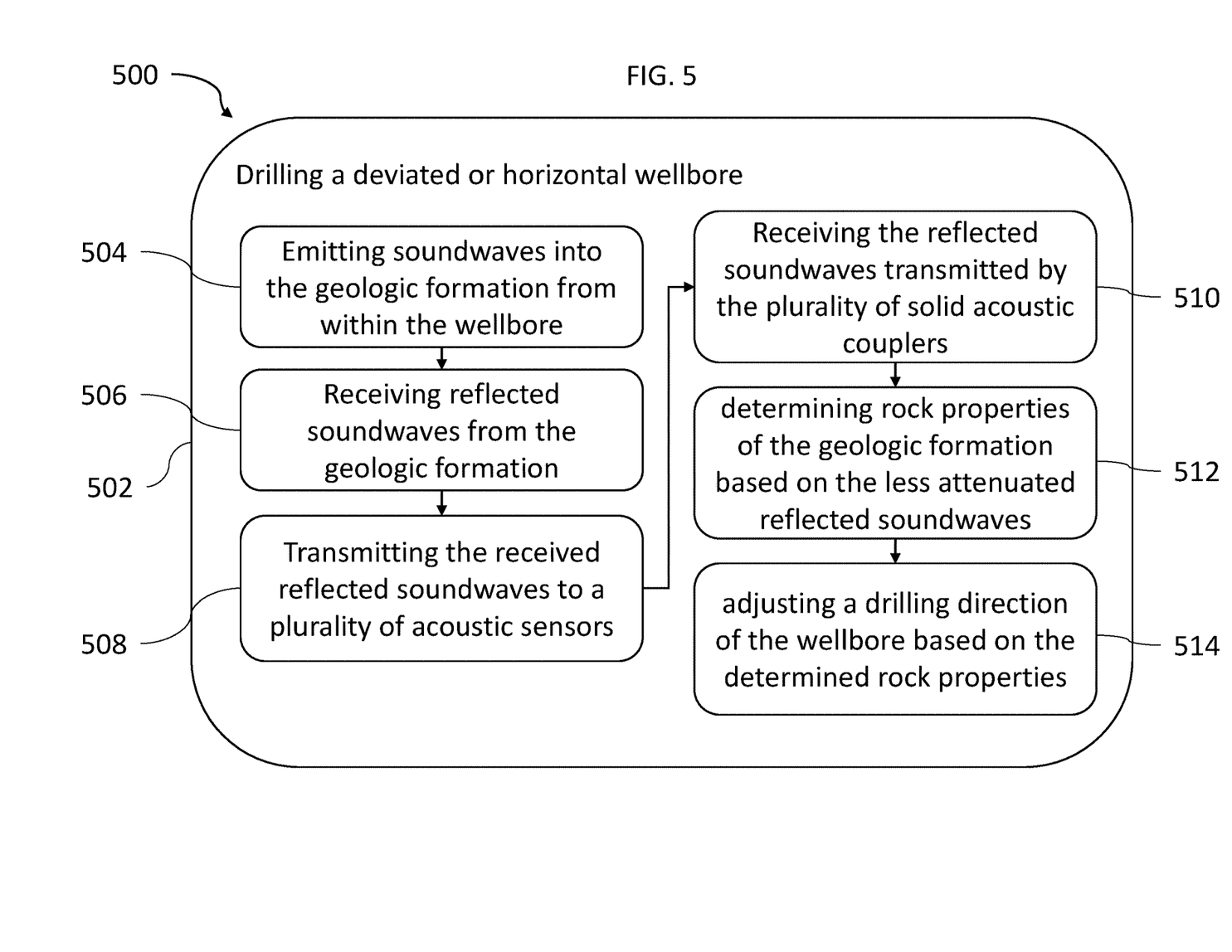
FIG. 5 is a flowchart of an example method that can be used with aspects of this disclosure.

FIG. 5 is a flowchart of a geo-steering method 500 that can be used with aspects of this disclosure. At 502, a deviated or horizontal wellbore is drilled, by a rotating drill bit positioned at a downhole end of a drill string, in a geologic formation with a multiphase fluid comprising a gas. Portions of the gas are released into the wellbore during drilling operations as the drilling takes place in an underbalanced condition.

Several steps of the method 500 take place during drilling operations. At 504 soundwaves are emitted into the geologic formation by a plurality of acoustic emitters attached to the drill string from within the wellbore. At 506, reflected soundwaves from the geologic formation are received by a set of solid acoustic couplers attached to the drill string. The reflected soundwaves are carried from the geologic formation to the solid acoustic couplers, at least in part, through the portions of the gas released into the wellbore during the drilling. At 508, the received reflected soundwaves are transmitted to a set of acoustic sensors by the solid acoustic couplers. The sensors are in physical contact with the solid acoustic couplers. The reflected soundwaves transmitted by the solid acoustic couplers are less attenuated compared to the reflected soundwaves transmitted through the portions of the gas released into the wellbore during the drilling. At 510 the reflected soundwaves transmitted by the plurality of solid acoustic couplers are received by the acoustic sensors. At 512, rock properties of the geologic formation are determined based on the less attenuated reflected soundwaves transmitted to the acoustic sensors by solid acoustic couplers. In some implementations, the less attenuated reflected soundwaves can be converted into data that includes the time the soundwave is received, the attenuation of the soundwave, the phase shift of the sound wave, the frequency of the sound wave, or any other pertinent data. The data can then be interpreted by software or an operator to determine rock properties.

At 514, a drilling direction is adjusted based on the determined rock properties. In some implementations, the drilling operations, for example, the drilling direction, can be adjusted in real-time. By real-time, it is meant that a duration between determining the rock properties and adjusting the drilling operations is small, for example, on the order of micro- or nano-seconds. Such real-time implementation is made possible by a computer system (not shown) that receives numerical values representing the acoustic signals as input and provides drilling operation instructions as output.

Thus, particular implementations of the subject matter have been described. It is understood that while aspects of this specification were discussed in the context of LWD, similar implementations may be used for acoustic logging tools deployed with coiled tubing. Other implementations are within the scope of the following claims.

What is claimed is:

1. A method comprising:
drilling, by a rotating drill bit positioned at a downhole end of a drill string, a deviated or horizontal wellbore in a geologic formation comprising a multiphase fluid comprising a gas, wherein portions of the gas are released into the wellbore during the drilling; and
during the drilling:
emitting, by a plurality of acoustic emitters attached to the drill string, soundwaves into the geologic formation from within the wellbore,
receiving, by a plurality of solid acoustic couplers attached to the drill string, wherein the plurality of acoustic couplers extend from an outer surface of the drill string into an annulus formed by an inner wall of the wellbore and the outer surface of the drill string, reflected soundwaves from the geologic formation, the reflected soundwaves carried from the geologic formation to the plurality of solid acoustic couplers at least in part through the portions of the gas released into the wellbore during the drilling,
transmitting, by the plurality of solid acoustic couplers, the received reflected soundwaves to a plurality of acoustic sensors contacting the plurality of solid acoustic couplers, wherein the reflected soundwaves transmitted by the plurality of solid acoustic couplers are less attenuated compared to the reflected soundwaves transmitted through the portions of the gas released into the wellbore during the drilling,
receiving, by the plurality of acoustic sensors, the reflected soundwaves transmitted by the plurality of solid acoustic couplers,
determining rock properties of the geologic formation based on the less attenuated reflected soundwaves transmitted to the plurality of acoustic sensors by the plurality of solid acoustic couplers, and
adjusting a drilling direction of the wellbore based on the determined rock properties.

2. The method of claim 1, wherein drilling the wellbore comprises drilling the wellbore in an underbalanced condition.

3. The method of claim 1, wherein the wellbore is less than 3 and ¾ inches in diameter.

4. The method of claim 1, wherein the drill string comprises coiled tubing.

5. The method of claim 1, wherein the plurality of solid acoustic couplers is a first plurality of solid acoustic couplers, wherein the method further comprises transmitting, by a second plurality of solid acoustic couplers contacting the plurality of acoustic transmitters and to the geologic formation, the soundwaves emitted by the plurality of acoustic transmitters.

6. The method of claim 5, wherein the first plurality of solid acoustic couplers has a different stiffness compared to the second plurality of solid acoustic couplers.

7. The method of claim 6, wherein the first plurality of solid acoustic couplers has less stiffness compared to the second plurality of solid acoustic couplers.

8. The method of claim 1, further comprising centralizing, by the plurality of solid acoustic couplers, the drill string in the wellbore.

9. The method of claim 1, wherein the plurality of solid acoustic couplers contact an inner wall of the wellbore to transmit the received reflected soundwaves to the plurality of acoustic sensors.

10. The method of claim 1, wherein the drilling direction of the wellbore is adjusted in real-time based on the determined rock properties of the geologic formation.

11. A bottom hole assembly comprising:
a drill string configured to be placed in a wellbore, the drill string comprising coiled tubing;
a drill bit positioned at a downhole end of the drill string, the drill bit configured to form the wellbore within a geologic formation;
a drill motor positioned uphole of the drill bit, the drill motor configured to rotate the drill bit independent of the drill string; and
an acoustic sub-assembly attached to the drill string, uphole of the drill motor, the acoustic sub assembly comprising:
a plurality of acoustic emitters, the plurality of acoustic emitters configured to emit emitted soundwaves into the geologic formation from within the wellbore;
a plurality of acoustic couplers, wherein the plurality of acoustic couplers extend from an outer surface of the acoustic sub-assembly into an annulus formed by an inner wall of the wellbore and the outer surface of the acoustic sub-assembly, the plurality of acoustic couplers configured to receive reflected soundwaves from the geologic formation within the wellbore, the reflected soundwaves being reflections of the emitted soundwaves; and
a plurality of acoustic sensors configured to be placed in the wellbore and attached to the plurality of acoustic couplers, the plurality of acoustic couplers configured to transmit the received reflected soundwaves from the geologic formation to the plurality of acoustic sensors with less signal attenuation compared to a direct transmission of the reflected soundwaves from the geologic formation to the plurality of acoustic sensors.

12. The bottom hole assembly of claim 11, wherein the plurality of acoustic couplers is sized to contact an inner wall of the wellbore.

13. The bottom hole assembly of claim 11, wherein each of the plurality of acoustic couplers is radially separated from each other at 90 degree intervals.

* * * * *